US012574306B1

(12) United States Patent
Tripathi

(10) Patent No.: US 12,574,306 B1
(45) Date of Patent: Mar. 10, 2026

(54) APPARATUS, SYSTEM, AND METHOD FOR ACHIEVING HIGH DATA RATES IN LINK DIAGNOSTIC TESTING BY REPLICATING TRAFFIC

(71) Applicant: Juniper Networks, Inc., Sunnyvale, CA (US)

(72) Inventor: Abhishek Tripathi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 514 days.

(21) Appl. No.: 18/328,558

(22) Filed: Jun. 2, 2023

(51) Int. Cl.
H04L 43/0811 (2022.01)
H04L 43/16 (2022.01)
H04L 43/50 (2022.01)

(52) U.S. Cl.
CPC .......... H04L 43/0811 (2013.01); H04L 43/16 (2013.01); H04L 43/50 (2013.01)

(58) Field of Classification Search
CPC ....... H04L 43/0811; H04L 43/16; H04L 43/50
See application file for complete search history.

(56) References Cited

U.S. PATENT DOCUMENTS

| | | | | |
|---|---|---|---|---|
| 8,259,587 B2 * | 9/2012 | Cuni | ....................... | H04L 43/00 |
| | | | | 370/241 |
| 2008/0100238 A1 * | 5/2008 | Shaw | .................... | H02P 7/2913 |
| | | | | 318/268 |
| 2013/0128729 A1 * | 5/2013 | Nair | .................... | H04L 41/0213 |
| | | | | 370/229 |
| 2015/0308836 A1 * | 10/2015 | Alvarez Tabio Togores | .............. | |
| | | | | G09B 29/10 |
| | | | | 701/400 |
| 2020/0195508 A1 * | 6/2020 | Benjamin | ............. | H04L 67/125 |
| 2022/0011749 A1 * | 1/2022 | Lee | ....................... | H04L 1/1614 |

* cited by examiner

*Primary Examiner* — Michael A Keller
*Assistant Examiner* — Thao D Duong
(74) *Attorney, Agent, or Firm* — Greenberg Traurig, LLP

(57) ABSTRACT

A disclosed computing device capable of achieving high data rates in link diagnostic testing by replicating traffic may include (1) a packet forwarding device configured to generate, as part of a link diagnostic test, traffic that falls below a certain threshold by a deficit and (2) a packet replication device configured to (A) receive at least a portion of the traffic from the packet forwarding device and (B) replicate the portion of traffic to generate supplemental traffic that compensates for the deficit, and (3) an interface configured to transmit the traffic and the supplemental traffic to a remote device via a link as part of the link diagnostic test. Various other apparatuses, systems, and methods are also disclosed.

20 Claims, 5 Drawing Sheets

Method
400

APPARATUS, SYSTEM, AND METHOD FOR ACHIEVING HIGH DATA RATES IN LINK DIAGNOSTIC TESTING BY REPLICATING TRAFFIC

BACKGROUND

Link diagnostic testing often necessitates a certain minimum rate of traffic. For example, a packet forwarding device of a router may initiate and/or perform a link diagnostic test (e.g., a link fault management test) to test the health and/or status of a link between the router and a remote device. In this example, the link diagnostic test may necessitate and/or call for traffic to be transmitted over the link at high speeds and/or even line rate (e.g., 100, 200, or 400 gigabits per second). Unfortunately, some packet forwarding devices may be unable to facilitate, provide, and/or support traffic at such speeds for the purpose of link diagnostic testing.

The instant disclosure, therefore, identifies and addresses a need for additional and/or improved apparatuses, systems, and methods for achieving high data rates in link diagnostic testing by replicating traffic.

SUMMARY

As will be described in greater detail below, the instant disclosure generally relates to apparatuses, systems, and methods for achieving high data rates in link diagnostic testing by replicating traffic. In one example, a computing device may include (1) a packet forwarding device configured to generate, as part of a link diagnostic test, traffic that falls below a certain threshold by a deficit and (2) a packet replication device configured to (A) receive at least a portion of the traffic from the packet forwarding device and (B) replicate the portion of traffic to generate supplemental traffic that compensates for the deficit, and (3) an interface configured to transmit the traffic and the supplemental traffic to a remote device via a link as part of the link diagnostic test.

Similarly, a system for achieving high data rates in link diagnostic testing by replicating traffic may include a computing device and an additional computing device communicatively coupled to one another via a link. In one example, the additional computing device may include (1) a packet forwarding device configured to generate, as part of a link diagnostic test, traffic that falls below a certain threshold by a deficit and (2) a packet replication device configured to (A) receive at least a portion of the traffic from the packet forwarding device and (B) replicate the portion of traffic to generate supplemental traffic that compensates for the deficit, and (3) an interface configured to transmit the traffic and the supplemental traffic to the computing device via the link as part of the link diagnostic test.

A corresponding method may include (1) generating, by a packet forwarding device as part of a link diagnostic test, traffic that falls below a certain threshold by a deficit, (2) receiving, by a packet replication device, at least a portion of the traffic from the packet forwarding device, (3) replicating, by the packet replication device, the portion of traffic to generate supplemental traffic that compensates for the deficit, and then (4) transmitting, by an interface, the traffic and the supplemental traffic to a remote device via a link as part of the link diagnostic test.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
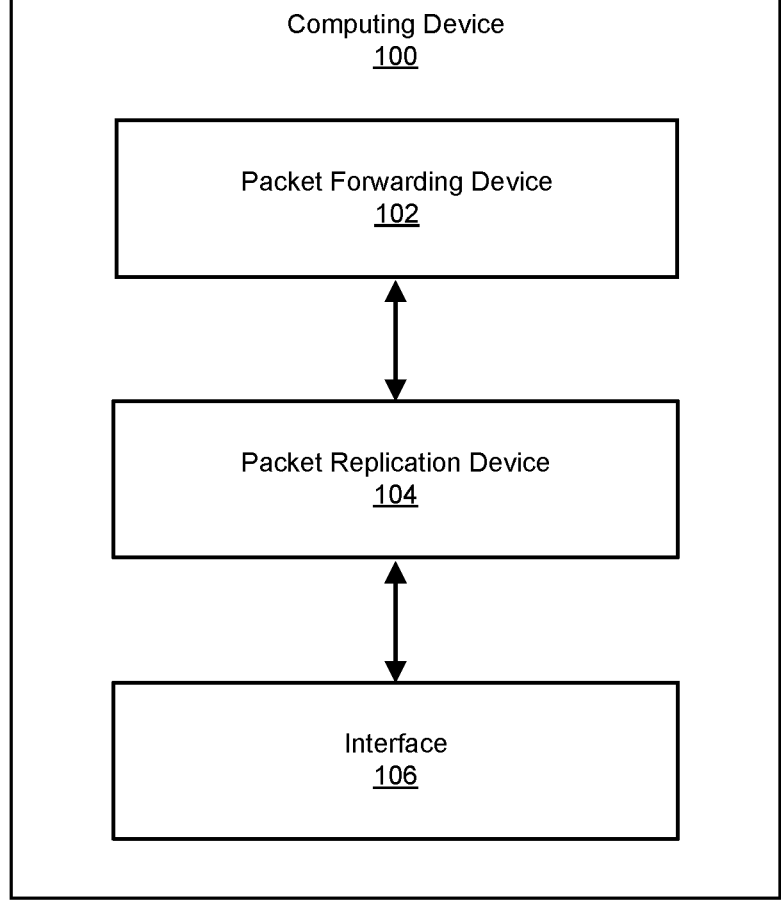
FIG. 1 is an illustration of an exemplary computing device capable of achieving high data rates in link diagnostic testing by replicating traffic in accordance with one or more embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for achieving high data rates in link diagnostic testing by replicating traffic. As will be described in greater detail below, embodiments of the present disclosure may include and/or involve offloading some of the responsibility and/or burden of traffic generation from a packet forwarding device to a packet replication device (such as a multicast engine). For example, a link diagnostic test (such as a link fault management test) may necessitate and/or require traffic transmitted at high speeds and/or line rate over a link under test. In this example, two routers may be communicatively coupled to one another via the link under test. To perform the link diagnostic test, a packet forwarding engine running on one of the routers may generate traffic that represents only a small fraction of the required amount per second.

In some examples, the packet forwarding engine may leverage and/or rely on separate application-specific integrated circuit (ASIC) support available on the router to generate the remaining traffic needed for the link diagnostic test. For example, the packet forwarding engine may forward, transmit, and/or send at least a portion of the traffic generated for the link diagnostic test to a packet replication device (such as a multicast engine) implemented on an ASIC within the router. In this example, the portion of traffic generated by the packet forwarding engine may fall below and/or short of the required amount by a certain deficit.

In some examples, upon receiving this traffic from the packet forwarding engine, the packet replication device may replicate the traffic to supply the remainder needed for the link diagnostic test. In other words, the packet replication may generate and/or produce enough supplemental traffic to compensate for and/or satisfy the deficit. As a specific example, if the packet forwarding device generates 10 megabits per second (Mbps) of injection traffic for a link diagnostic test that calls for 100 gigabits per second (Gbps) of traffic, the packet forwarding device may program the packet replication device to generate 10,000 copies of the injection traffic to achieve and/or reach the necessary 100 Gbps of traffic. In this example, upon receiving the 10 Mbps of injection traffic from the packet forwarding device, the packet replication device may generate 10,000 copies of the injection traffic, resulting in a total of 100 Gbps of traffic for the link diagnostic test.

In some examples, the packet replication device may be communicatively coupled (whether directly or indirectly) to a loopback path and/or an interface configured to transmit the traffic to a remote device via the link under test. In one example, the packet replication device may replicate the injection traffic by cycling and/or circulating some or all of the injection traffic a certain number of times via the loopback path. For example, the 10 Mbps of injection traffic may need to make 10,000 passes, cycles, and/or circulations via the loopback path to achieve and/or reach 100 Gbps of traffic for the link diagnostic test. The packet replication device and/or another feature of the loopback path may lead to the interface for transmission to the remote device via the link under test. Accordingly, the traffic may exit the packet replication device and/or the loopback path toward the interface for transmission to the remote device via the link under test. One or more of the routers may then use the results of this link diagnostic test to assess the health and/or status of the link under test.

Figure 2:
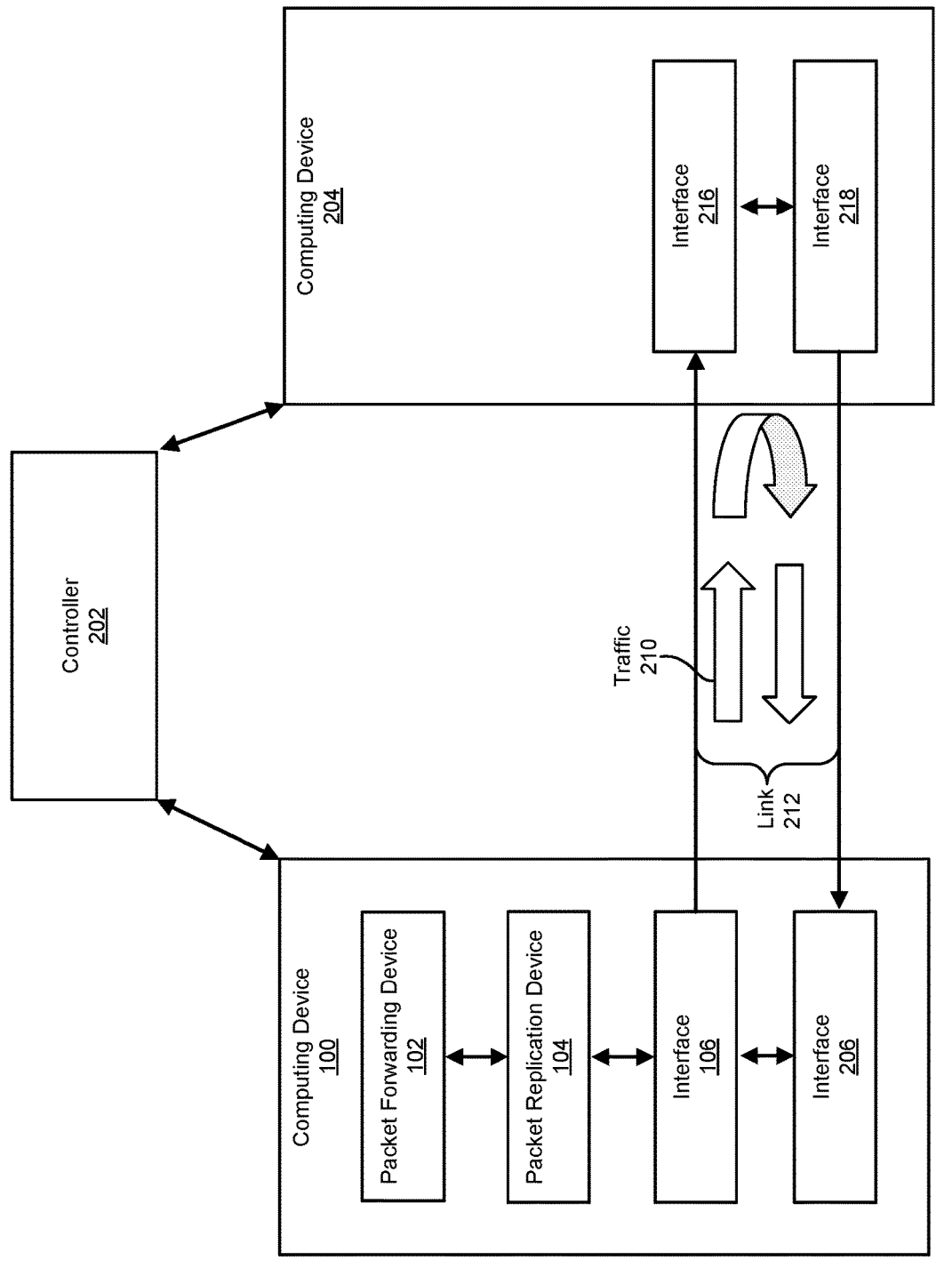
FIG. 2 is an illustration of an exemplary system capable of achieving high data rates in link diagnostic testing by replicating traffic in accordance with one or more embodiments of this disclosure.
Figure 3:
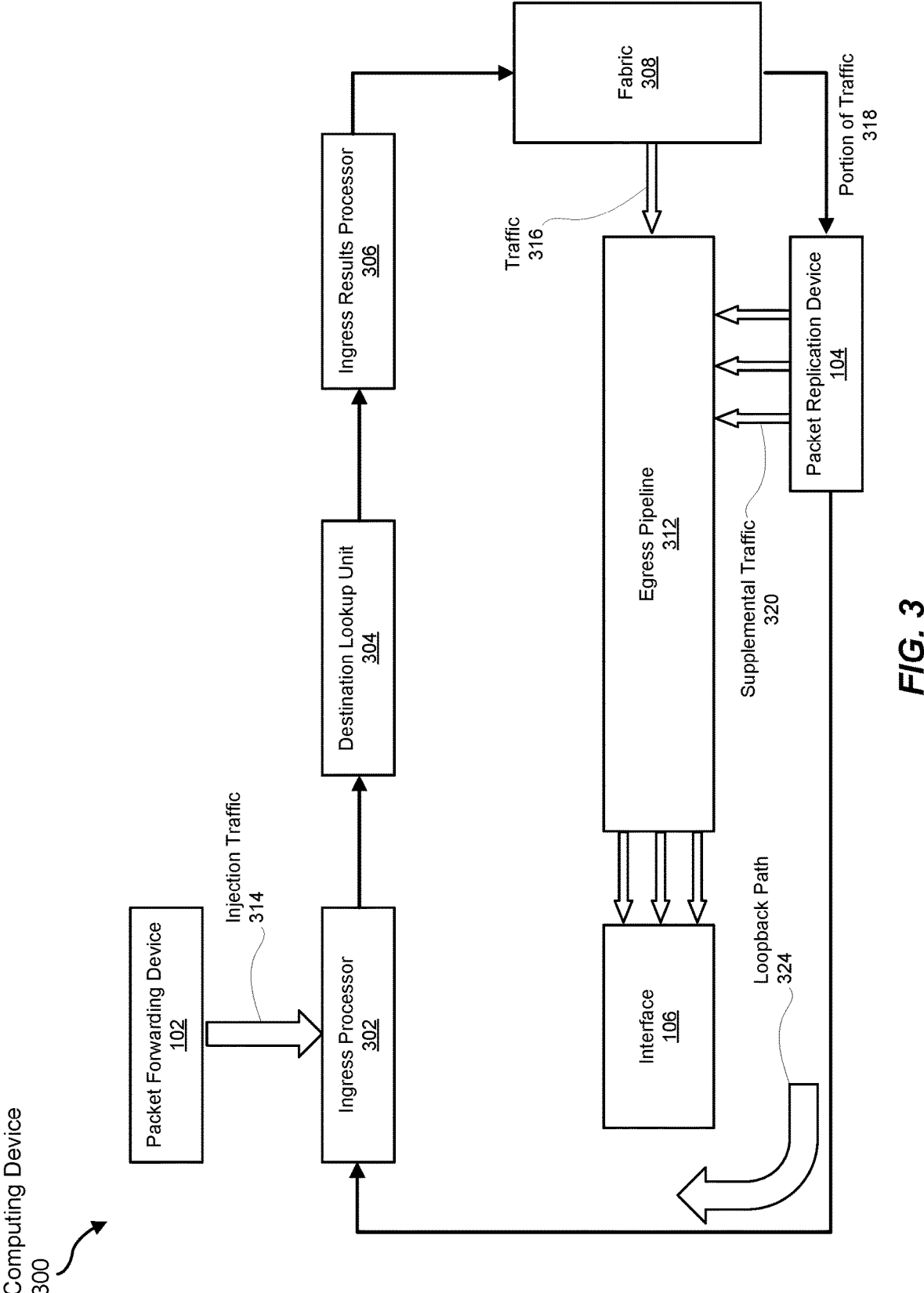
FIG. 3 is an illustration of an exemplary computing device capable of achieving high data rates in link diagnostic testing by replicating traffic in accordance with one or more embodiments of this disclosure.

The following will provide, with reference to FIGS. 1-3, detailed descriptions of exemplary apparatuses, devices, systems, and corresponding implementations for achieving high data rates in link diagnostic testing by replicating traffic. Detailed descriptions of an exemplary method for achieving high data rates in link diagnostic testing by replicating traffic will be provided in connection with FIG. 4. In addition, detailed descriptions of an exemplary computing system for carrying out such a method will be provided in connection with FIG. 5.

FIG. 1 illustrates at least a portion of an exemplary computing device 100 capable of achieving high data rates in link diagnostic testing by replicating traffic. As illustrated in FIG. 1, exemplary computing device 100 may include and/or represent a packet forwarding device 102, packet replication device 104, and/or an interface 106. In some examples, packet forwarding device 102 may be communicatively and/or electrically coupled to packet replication device 104 and/or interface 106. Additionally or alternatively, packet replication device 104 may be communicatively and/or electrically coupled to packet forwarding device 102 and/or interface 106. Although not necessarily illustrated and/or labelled in this way in FIG. 1, computing device 100 may also include and/or represent various other circuits, components, and/or devices beyond or in addition to packet forwarding device 102, packet replication device 104, and/or an interface 106.

In some examples, packet forwarding device 102 may be configured and/or programmed to generate network traffic in connection with and/or as part of a link diagnostic test (e.g., a link fault management test). In such examples, network traffic may include and/or represent data packets destined for transmission to a remote device (not necessarily illustrated and/or labelled in FIG. 1) via a link under test. In one example, packet forwarding device 102 may generate and/or produce an amount of traffic that falls below a certain threshold of the link diagnostic test by a deficit. For example, if the link diagnostic test calls for and/or requires a certain data rate, packet forwarding device 102 may generate and/or produce an amount of traffic that falls below and/or short of that data rate by a certain deficit.

In some examples, packet replication device 104 may be configured and/or programmed to receive at least some of the traffic generated by packet forwarding device 102 and/or replicate such traffic to compensate for the deficit. For example, packet replication device 104 may receive and/or obtain some injection traffic (e.g., a host injection frame) from packet forwarding device 102. In this example, packet replication device 104 may then generate copies of the injection traffic. These copies may effectively supplement and/or enhance the injection traffic to compensate for and/or satisfy the deficit. As a result, packet replication device 104 may enable computing device 100 and/or packet forwarding device 102 to generate sufficient traffic to facilitate and/or support the link diagnostic test even if packet forwarding device 102 is unable to do so on its own.

In some examples, interface 106 may be configured to and/or programmed transmit the traffic generated by packet forwarding device 102 and/or the supplemental traffic generated by packet replication device 104. In one example, interface 106 may receive and/or obtain traffic from packet forwarding device 102 and/or packet replication device 104 and then forward, send, and/or transmit such traffic to a remote device via the link under test. Additionally or alternatively, interface 106 and/or another interface (not necessarily illustrated and/or labelled in FIG. 1) may receive and/or collect such traffic in return from the remote device as part of the link diagnostic test. Computing device 100 and/or the remote device may then use the results of the link diagnostic test (e.g., the traffic traversing the link under test) to assess the health and/or status of the link under test.

In some examples, packet forwarding device 102 may constitute and/or represent a hardware component or circuitry incorporated into computing device 100. For example, packet forwarding device 102 may include and/or represent a packet forwarding engine and/or line card. In this example, packet forwarding device 102 may facilitate, provide, and/or support packet switching for different layers of the Open Systems Interconnection (OSI) model, route lookups, and/or packet forwarding. Additional examples of packet forwarding device 102 include, ASICs, Systems on Chips (SoCs), processors, multiprocessors, central processing units (CPUs), graphics processing units (GPUs), field-programmable gate arrays (FPGAs), parallel accelerated processors, tensor cores, integrated circuits, chiplets, optical modules, receivers, transmitters, transceivers, optical modules, traffic-forwarding devices, portions of one or more of the same, variations or combinations of one or more of the same, and/or any other suitable packet forwarding devices.

In some examples, packet replication device 104 may constitute and/or represent a hardware component or circuitry incorporated into computing device 100. For example, packet replication device 104 may include and/or represent a multicast device and/or engine. In this example, packet replication device 104 may facilitate, provide, and/or support generating multicast traffic and/or packets or making copies of traffic and/or packets. Packet replication device 104 and packet forwarding device 102 may be separate and/or distinct from one another. Additional examples of packet replication device 104 include, ASICs, SoCs, processors, multiprocessors, line cards, CPUs, GPUs, FPGAs, parallel accelerated processors, tensor cores, integrated circuits, chiplets, portions of one or more of the same, variations or combinations of one or more of the same, and/or any other suitable packet replication devices.

In some examples, interface 106 may constitute and/or represent a hardware component and/or circuitry incorporated into computing device 100. In one example, interface 106 may forward, send, and/or transmit traffic to the remote device via the link under test as part of the link diagnostic test. Interface 106 may include and/or represent a transceiver, a transmitter, and/or a receiver. Additional examples of interface 106 include, without limitation, communication ports, optical modules, physical interface cards (PICs), flexible PIC concentrators (FPCs), switch interface boards (SIBs), control boards, connector interface panels, egress interfaces, ingress interfaces, portions of one or more of the same, combinations or variations of one or more of the same, and/or any other suitable interface.

In some examples, computing device 100 may constitute and/or represent any type or form of hardware device and/or unit capable of reading computer-executable instructions and/or handling network traffic. In one example, computing device 100 may include and/or represent one or more router (such as provider edge routers, hub routers, spoke routers, autonomous system boundary routers, and/or area border routers) that receives, routes, forwards, and/or otherwise handles network traffic. Additional examples of computing device 100 include, without limitation, switches, hubs, modems, bridges, repeaters, gateways, multiplexers, network adapters, network interfaces, client devices, laptops, tablets, desktops, servers, cellular phones, multimedia players, embedded systems, wearable devices, gaming consoles, variations or combinations of one or more of the same, and/or any other suitable computing devices.

FIG. 2 illustrates at least a portion of an exemplary system 200 that includes and/or represents computing device 100, a computing device 204, and a controller 202. In some examples, system 200 in FIG. 2 may include and/or represent certain devices, components, configurations, and/or features that perform and/or provide functionalities that are similar and/or identical to those described above in connection with FIG. 1. In one example, computing devices 100 and 204 may be communicatively coupled to one another via a link 212. Additionally or alternatively, controller 202 may be communicatively coupled to computing device 100 and/or computing device 204. In this example, computing devices 100 and 204 may exchange traffic 210 with one another over link 212 as part of a link diagnostic test initiated and/or requested by controller 202.

In some examples, computing device 100 may include and/or represent interface 106 and an interface 206, and computing device 204 may include and/or represent an interface 216 and an interface 218. In such examples, interfaces 106 and 216 may be communicatively coupled to one another, and interfaces 206 and 218 may be communicatively coupled to one another. In one example, interfaces 106 and 218 may each include and/or represent a transmitter.

Additionally or alternatively, interfaces 206 and 216 may each include and/or represent a receiver.

In some examples, link 212 may facilitate, provide, and/or support one-way communications from computing device 100 to computing device 204. In other examples, link 212 may facilitate, provide, and/or support two-way communications between computing device 100 and computing device 204. In one example, computing device 100, computing device 204, and/or controller 202 may analyze, assess, and/or evaluate the health and/or status of link 212 and/or potentially diagnose a problem with link 212 based at least in part on traffic 210. For example, interface 106 of computing device 100 may forward, send, and/or transmit traffic 210 to interface 216 of computing device 204. In this example, interface 218 of computing device 204 may then forward, send, and/or transmit traffic 210 back to interface 206 of computing device 100. In addition, computing device 100, computing device 204, and/or controller 202 may be able to perform one or more actions in connection with system 200 based at least in part on the health and/or status of link 212.

In some examples, packet forwarding device 102 may calculate and/or compute the deficit by which the traffic generated by packet forwarding device 102 falls below and/or short of the threshold required by the link diagnostic test. For example, packet forwarding device 102 may know, discover, and/or determine that it is injecting 10 Mbps of traffic to packet replication device 104 and/or the corresponding loopback path for the link diagnostic test. In this example, packet forwarding device 102 may also know, discover, and/or determine that the link diagnostic test calls for, necessitates, and/or requires 100 Gbps of traffic. Accordingly, packet forwarding device 102 may calculate and/or compute the deficit in its traffic generation by subtracting 10 Mbps of traffic from 100 Gbps of traffic. In certain implementations, packet forwarding device 102 may program and/or configure packet replication device 104 to generate enough supplemental traffic to compensate and/or satisfy the deficit.

In some examples, packet forwarding device 102 may know, discover, and/or identify a replication power and/or capability of packet replication device 104. For example, packet replication device 104 may have and/or exhibit a replication power of 100 copies per pass, cycle, and/or circulation. In one example, the replication power may constitute and/or represent the ability and/or capability of packet forwarding device 102 to make a certain number of copies of the injection traffic frame per pass, cycle, and/or circulation. Accordingly, if its replication power is 100 copies per pass and/or cycle, packet replication device 104 may be able to make 100 copies of the injection traffic frame each time that the injection traffic frame generated by packet forwarding device 102 passes and/or cycles around or through the corresponding loopback path. In certain implementations, packet forwarding device 102 may determine the replication power of packet replication device 104 by identifying the number of copies of the injection traffic frame that packet replication device 104 is capable of generating per pass and/or cycle via the corresponding loopback path.

Continuing with this example, packet forwarding device 102 may calculate, compute, and/or determine the number of passes and/or cycles of the injection traffic frame that are needed for packet replication device 104 to generate enough supplemental traffic to compensate for and/or satisfy the deficit based at least in part on the injection traffic, the replication power of packet replication device 104, and/or the threshold amount of traffic required by the link diagnostic test. For example, if the injection traffic is 10 Mbps and the link diagnostic test requires 100 Gbps, then packet forwarding device 102 may calculate, compute, and/or determine that packet replication device 104 is to generate 10,000 copies of the injection traffic to compensate for and/or satisfy the deficit. Specifically, the packet forwarding device may divide the required threshold of traffic by the injection traffic amount to produce a quotient representative of the number of copies needed for the link diagnostic test (e.g., $$\left(\text{e.g., Copies of Injection Traffic} = \right.$$

$$\frac{\text{Amount of Traffic Required by Link Diagnostic Test}}{\text{Amount of Injection Traffic}} \rightarrow$$

$$\left. 10,000 \text{ copies} = \frac{100 \text{ Gbps}}{10 \text{ Mbps}} \right).$$

In this example, if the replication power of packet replication device 104 is 100 copies per pass and/or cycle, packet forwarding device 102 may further calculate, compute, and/or determine that the injection traffic is to make 100 passes and/or cycles on packet replication device 104 for packet replication device 104 to generate 10,000 copies. Specifically, packet forwarding device 102 may divide the quotient representative of the number of copies needed for the link diagnostic test by the replication power of packet replication device 104 to calculate the number of cycles and/or passes needed to generate enough supplemental traffic for the link diagnostic test (e.g., $$\left(\text{e.g., Passes} = \right.$$

$$\frac{\text{Copies of Injection Traffic}}{\text{Replication Power}} \rightarrow 100 \text{ passes} = \left. \frac{10,000 \text{ Copies}}{100 \text{ Copies per Pass}} \right).$$

In certain implementations, packet forwarding device 102 may determine the number of passes and/or cycles that are needed in a single calculation and/or computation (e.g., by combining and/or consolidating the formulas and/or equations presented above into a single calculation and/or computation).

In some examples, packet forwarding device 102 may program and/or configure packet replication device 104 to cause and/or direct the injection traffic to make a certain number of passes and/or cycles on packet replication device 104 via the corresponding loopback path. For example, packet forwarding device 102 may program and/or configure packet replication device 104 to cause and/or direct the injection traffic to make a certain number of passes and/or cycles on packet replication device 104 via the corresponding loopback path. Additionally or alternatively, packet forwarding device 102 may program and/or configure packet replication device 104 to generate a certain number of copies per pass and/or cycle of the injection traffic. For example, packet forwarding device 102 may program and/or configure packet replication device 104 to generate 100 copies of the injection traffic per pass and/or cycle of the injection traffic.

FIG. 3 illustrates at least a portion of an exemplary computing device 300 capable of achieving high data rates in link diagnostic testing by replicating traffic. In some examples, computing device 300 in FIG. 3 may include and/or represent certain devices, components, configurations, and/or features that perform and/or provide functionalities that are similar and/or identical to those described above in connection with either FIG. 1 or FIG. 2. In one example, computing device 300 may include and/or represent packet forwarding device 102, packet replication device 104, interface 106, an ingress processor 302, a destination lookup unit 304, an ingress results processor 306, a fabric 308, and/or an egress pipeline 312.

In some examples, packet forwarding device 102 may be communicatively and/or electrically coupled to ingress processor 302. In one example, ingress processor 302 may be communicatively and/or electrically coupled between packet replication device 104 and destination lookup unit 304. In this example, destination lookup unit 304 may be communicatively and/or electrically coupled between ingress processor 302 and ingress results processor 306. Additionally or alternatively, ingress results processor 306 may be communicatively and/or electrically coupled between destination lookup unit 304 and fabric 308.

In some examples, fabric 308 may be communicatively and/or electrically coupled between ingress results processor 306 and/or packet replication device 104 and/or egress pipeline 312. In one example, packet replication device 104 may be communicatively and/or electrically coupled between fabric 308 and/or ingress processor 302 and/or egress pipeline 312. In this example, egress pipeline 312 may be communicatively and/or electrically coupled between fabric 308 and/or packet replication device 104 and/or interface 106.

In some examples, certain components and/or features of computing device 300 may form, constitute, and/or represent a loopback path 324 that returns a portion of the traffic to packet replication device 104. For example, loopback path 324 may include and/or represent ingress processor 302, destination lookup unit 304, ingress results processor 306, fabric 308, and/or packet replication device 104. In one example, packet forwarding device 102 may forward, send, and/or transmit injection traffic 314 to ingress processor 302. In this example, ingress processor 302 may parse injection traffic 314, identify the corresponding communication protocol (e.g., Internet protocol version 4, Internet protocol version 6, etc.), and/or identify the corresponding frame format.

In some examples, ingress processor 302 may forward, send, and/or transmit injection traffic 314 to destination lookup unit 304. In one example, destination lookup unit 304 may perform a lookup operation to determine the destination of injection traffic 314. In this example, destination lookup unit 304 may forward, send, and/or transmit injection traffic 314 to ingress results processor 306. Additionally or alternatively, ingress results processor 306 may process injection traffic 314 based at least in part on the destination determined by the destination lookup unit 304.

In some examples, ingress results processor 306 may forward, send, and/or transmit at least a portion of injection traffic 314 to packet replication device 104 via fabric 308. In one example, this arrival of injection traffic 314 at packet replication device 104 may constitute and/or represent the first pass and/or cycle of injection traffic 314 on packet replication device 104. Additionally or alternatively, ingress results processor 306 may forward, send, and/or transmit a portion of injection traffic 314 to egress pipeline 312 via fabric 308 on the way to interface 106. In one example, this portion of injection traffic 314 that traverses from ingress results processor 306 to egress pipeline 312 in this way may include and/or represent traffic 316.

In some examples, packet replication device 104 may replicate injection traffic 314 by generating at least a portion of supplemental traffic 320 that compensates for and/or satisfies a deficit between injection traffic 314 and a threshold amount of traffic required by a link diagnostic test. In one example, packet replication device 104 may forward, send, and/or transmit all or a majority of this portion of supplemental traffic 320 to interface 106 via egress pipeline 312. In this example, packet replication device 104 may cycle injection traffic 314 or a corresponding copy (e.g., a minority of this portion of supplemental traffic 320) via loopback path 324 to facilitate further replication. In other words, packet replication device 104 may forward, send, and/or transmit injection traffic 314 or the corresponding copy around loopback path 324 so that packet replication device 104 is able to further replicate injection traffic 314 or the corresponding copy. In certain implementations, the corresponding copy may constitute and/or represent a single copy of injection traffic 314.

In some examples, after injection traffic 314 or the corresponding copy returns to packet replication device 104 via loopback path 324, packet replication device 104 may further replicate injection traffic 314 or the corresponding copy by generating another portion of supplemental traffic 320 for the link diagnostic test. In one example, packet replication device 104 may forward, send, and/or transmit all or a majority of this other portion of supplemental traffic 320 to interface 106 via egress pipeline 312. In this example, packet replication device 104 may cycle injection traffic 314 or a corresponding copy (e.g., a minority of this other portion of supplemental traffic 320) via loopback path 324 to facilitate even further replication. In other words, packet replication device 104 may forward, send, and/or transmit injection traffic 314 or the corresponding copy around loopback path 324 so that packet replication device 104 is able to even further replicate injection traffic 314 or the corresponding copy.

In some examples, each time injection traffic 314 or a corresponding copy passes and/or cycles around loopback path 324, packet replication device 104 may generate a new portion of supplemental traffic 320. In one example, after each generation of a new portion of supplemental traffic 320, packet replication device 104 may forward, send, and/or transmit the new portion of supplemental traffic 320 to interface 106 via egress pipeline 312. Additionally or alternatively, after each generation of a new portion of supplemental traffic 320, packet replication device 104 may forward, send, and/or transmit injection traffic 314 or a corresponding copy (e.g., from supplemental traffic 320) around loopback path 324. This cycling and/or circulation of injection traffic 314 or a corresponding copy may continue and/or be repeated until enough supplemental traffic 320 (e.g., based on the accumulation of different portions) is generated by packet replication device 104 to fully compensate for and/or satisfy the deficit between injection traffic 314 and the threshold required by the link diagnostic test.

In some examples, although not necessarily illustrated in this way in FIG. 3, computing device 300 may include and/or represent multiple instances of packet replication device 104 and/or loopback path 324. In such examples, packet forwarding device 102 may forward, send, and/or transmit injection traffic 314 to those multiple instances of packet replication device 104. By doing so, those multiple instances of packet replication device 104 may simultaneously generate supplemental traffic to facilitate and/or support the link diagnostic test consistent with the aims and/or objectives described herein. Additionally or alternatively, the various devices and/or components described herein (e.g., packet forwarding device 102) may adapt and/or scale their functionalities to accommodate those multiple instances of packet replication device 104 for the purpose of achieving high data rates in link diagnostic testing by replicating traffic.

In some examples, the various devices and systems described in connection with FIGS. 1-3 may include and/or represent one or more additional circuits, components, and/or features that are not necessarily illustrated and/or labeled in FIGS. 1-3. For example, the devices illustrated in FIGS. 1-3 may also include and/or represent additional analog and/or digital circuitry, onboard logic, transistors, transmitters, receivers, transceivers, antennas, resistors, capacitors, diodes, inductors, switches, registers, flipflops, connections, traces, buses, semiconductor (e.g., silicon) devices and/or structures, processing devices, storage devices, circuit boards, sensors, packages, substrates, housings, combinations or variations of one or more of the same, and/or any other suitable components that facilitate and/or support achieving high data rates in link diagnostic testing by replicating traffic. In certain implementations, one or more of these additional circuits, components, and/or features may be inserted and/or applied between any of the existing circuits, components, and/or features illustrated in FIGS. 1-3 consistent with the aims and/or objectives described herein. Accordingly, the couplings and/or connections described with reference to FIGS. 1-3 may be direct connections with no intermediate components, devices, and/or nodes or indirect connections with one or more intermediate components, devices, and/or nodes.

In some examples, the phrase "to couple" and/or the term "coupling", as used herein, may refer to a direct connection and/or an indirect connection. For example, a direct coupling between two components may constitute and/or represent a coupling in which those two components are directly connected to each other by a single node that provides continuity from one of those two components to the other. In other words, the direct coupling may exclude and/or omit any additional components between those two components.

Additionally or alternatively, an indirect coupling between two components may constitute and/or represent a coupling in which those two components are indirectly connected to each other by multiple nodes that fail to provide continuity from one of those two components to the other. In other words, the indirect coupling may include and/or incorporate at least one additional component between those two components.

Figure 4:
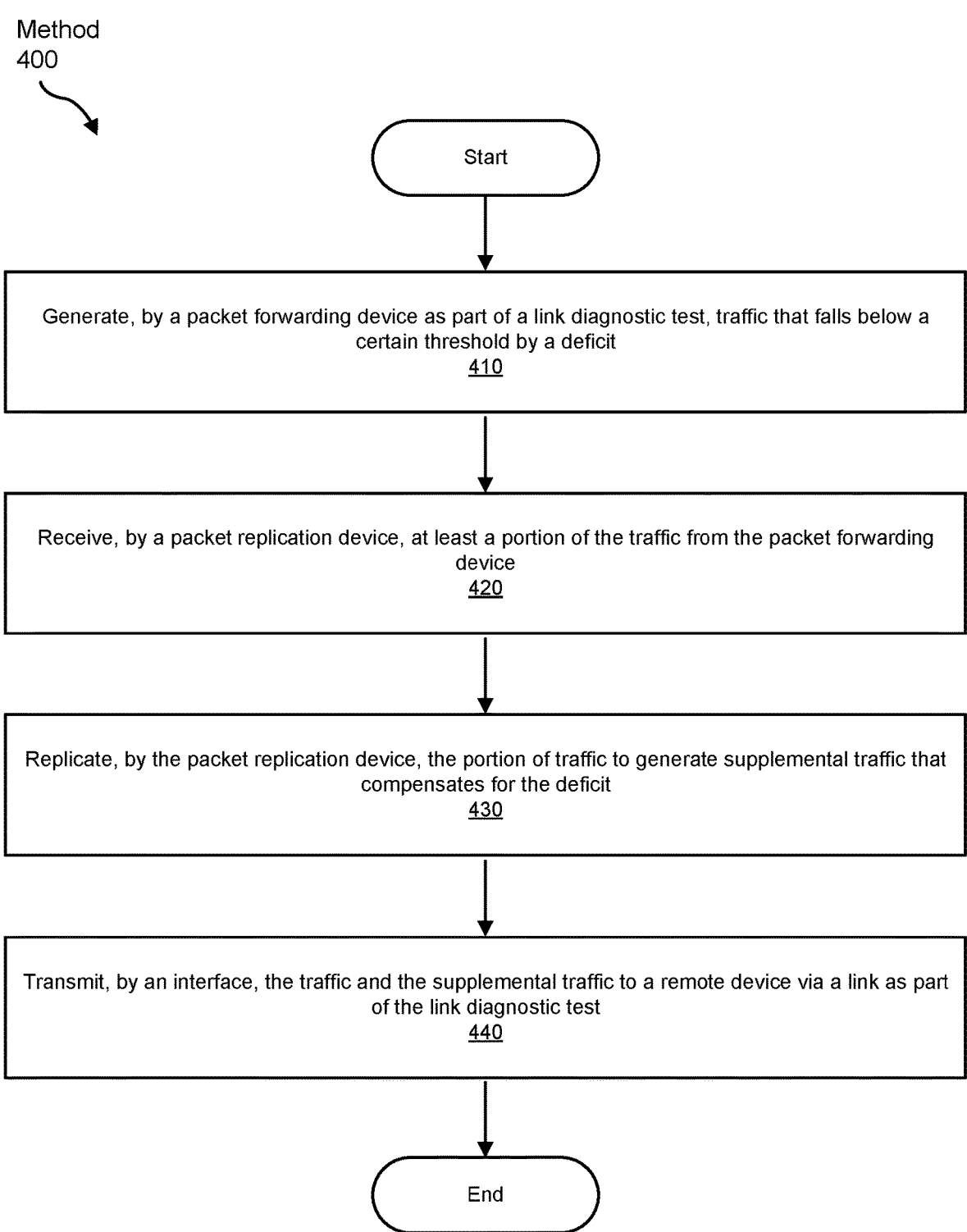
FIG. 4 is a flow diagram of an exemplary method for achieving high data rates in link diagnostic testing by replicating traffic in accordance with one or more embodiments of this disclosure.

FIG. 4 is a flow diagram of an exemplary method 400 for achieving high data rates in link diagnostic testing by replicating traffic. In one example, the steps shown in FIG. 4 may be achieved and/or accomplished by a system, computing device, and/or server for facilitating and/or supporting achieving high data rates in link diagnostic testing by replicating traffic. Additionally or alternatively, the steps shown in FIG. 4 may incorporate and/or involve certain sub-steps and/or variations consistent with the descriptions provided above in connection with FIGS. 1-3.

As illustrated in FIG. 4, method 400 may include the step of generating, by a packet forwarding device as part of a link diagnostic test, traffic that falls below a certain threshold by a deficit (410). Step 410 may be performed in a variety of ways, including any of those described above in connection with FIGS. 1-3. For example, a packet forwarding device may generate traffic that falls below a certain threshold by a deficit as part of a link diagnostic test.

Method 400 may also include the step of receiving, by a packet replication device, at least a portion of the traffic from the packet forwarding device (420). Step 420 may be performed in a variety of ways, including any of those described above in connection with FIGS. 1-3. For example, a packet replication device may receive at least a portion of the traffic from the packet forwarding device.

Method 400 may further include the step of replicating, by the packet replication device, the portion of traffic to generate supplemental traffic that compensates for the deficit (430). Step 430 may be performed in a variety of ways, including any of those described above in connection with FIGS. 1-3. For example, the packet replication device may replicate the portion of traffic to generate supplemental traffic that compensates for the deficit.

Method 400 may additionally include the step of transmitting, by an interface, the supplemental traffic to a remote device via a link as part of the link diagnostic test (440). Step 440 may be performed in a variety of ways, including any of those described above in connection with FIGS. 1-3. For example, the interface may transmit the supplemental traffic to a remote device via a link as part of the link diagnostic test. In one example, the interface may also transmit the traffic to the remote device via the link as part of the link diagnostic test.

Figure 5:
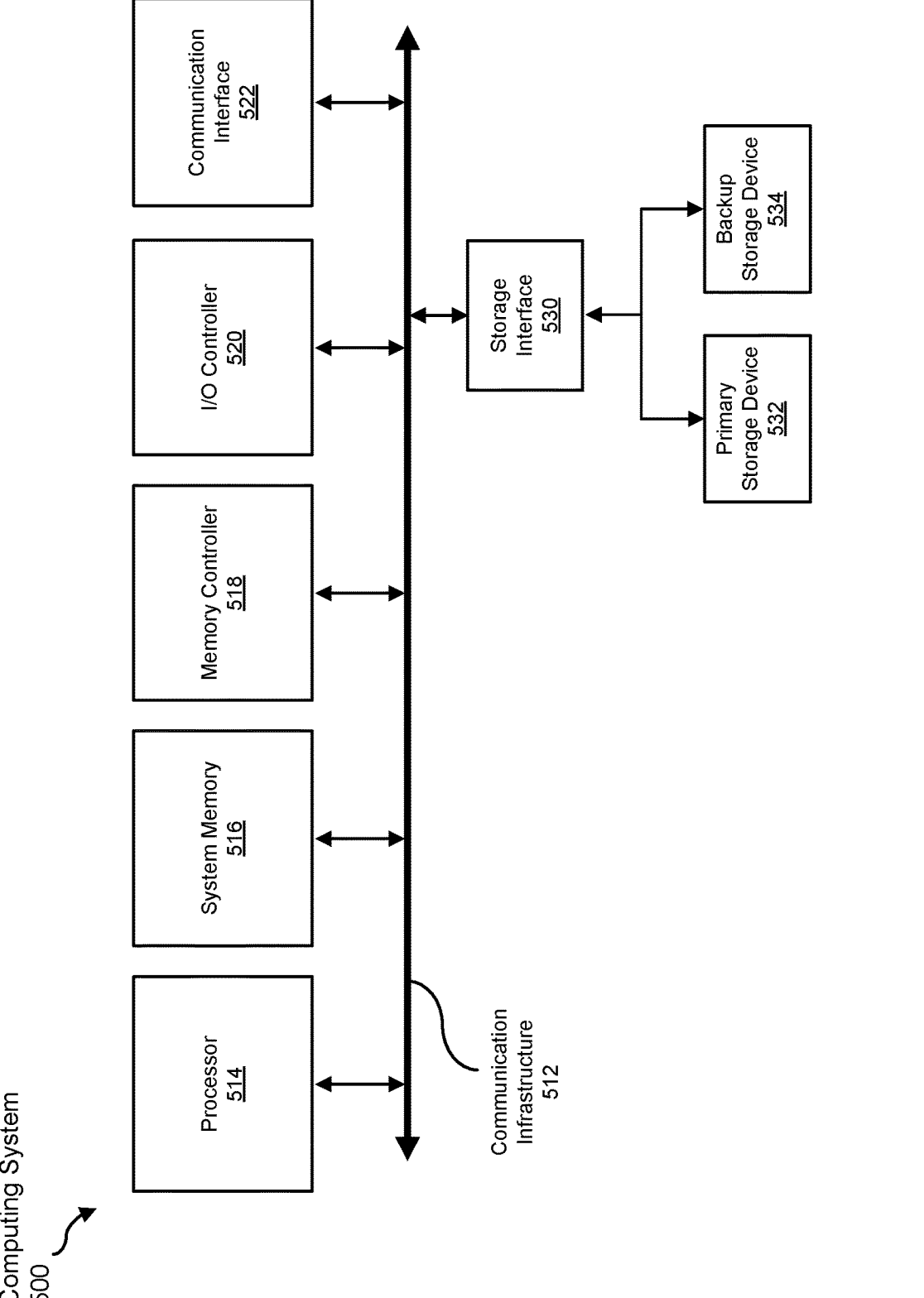
FIG. 5 is a block diagram of an exemplary computing system capable of implementing and/or being used in connection with one or more of the embodiments described and/or illustrated herein.

FIG. 5 is a block diagram of an exemplary computing system 500 capable of implementing and/or being used in connection with one or more of the embodiments described and/or illustrated herein. In some embodiments, all or a portion of computing system 500 may perform and/or be a means for performing, either alone or in combination with other elements, one or more of the steps described in connection with FIG. 6. All or a portion of computing system 500 may also perform and/or be a means for performing and/or implementing any other steps, methods, or processes described and/or illustrated herein.

Computing system 500 broadly represents any type or form of electrical load, including a single or multi-processor computing device or system capable of executing computer-readable instructions. Examples of computing system 500 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 500 may be programmed, configured, and/or otherwise designed to comply with one or more networking protocols. According to certain embodiments, computing system 500 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 500 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPOE), a Point-to-Point Protocol over ATM (PPPOA), a Bluetooth protocol, an IEEE 802.XX protocol, a frame relay protocol, a token ring protocol, a spanning tree protocol, and/or any other suitable protocol.

Computing system 500 may include various network and/or computing components. For example, computing system 500 may include at least one processor 514 and a system memory 516. Processor 514 generally represents any type or form of processing unit capable of processing data or interpreting and executing instructions. For example, processor 514 may represent an application-specific integrated circuit (ASIC), a system on a chip (e.g., a network processor), a hardware accelerator, a general purpose processor, and/or any other suitable processing element.

Processor 514 may process data according to one or more of the networking protocols discussed above. For example, processor 514 may execute or implement a portion of a protocol stack, may process packets, may perform memory operations (e.g., queuing packets for later processing), may execute end-user applications, and/or may perform any other processing tasks.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 500 may include both a volatile memory unit (such as, for example, system memory 516) and a non-volatile storage device (such as, for example, primary storage device 532, as described in detail below). System memory 516 may be implemented as shared memory and/or distributed memory in a network device. Furthermore, system memory 516 may store packets and/or other information used in networking operations.

In certain embodiments, exemplary computing system 500 may also include one or more components or elements in addition to processor 514 and system memory 516. For example, as illustrated in FIG. 5, computing system 500 may include a memory controller 518, an Input/Output (I/O) controller 520, and a communication interface 522, each of which may be interconnected via communication infrastructure 512. Communication infrastructure 512 generally represents any type or form of infrastructure capable of facilitating communication between one or more components of a computing device. Examples of communication infrastructure 512 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 518 generally represents any type or form of device capable of handling memory or data or controlling communication between one or more components of computing system 500. For example, in certain embodiments memory controller 518 may control communication between processor 514, system memory 516, and I/O controller 520 via communication infrastructure 512. In some embodiments, memory controller 518 may include a Direct Memory Access (DMA) unit that may transfer data (e.g., packets) to or from a link adapter.

I/O controller 520 generally represents any type or form of device or module capable of coordinating and/or controlling the input and output functions of a computing device.

For example, in certain embodiments I/O controller 520 may control or facilitate transfer of data between one or more elements of computing system 500, such as processor 514, system memory 516, communication interface 522, and storage interface 530.

Communication interface 522 broadly represents any type or form of communication device or adapter capable of facilitating communication between exemplary computing system 500 and one or more additional devices. For example, in certain embodiments communication interface 522 may facilitate communication between computing system 500 and a private or public network including additional computing systems. Examples of communication interface 522 include, without limitation, a link adapter, a wired network interface (such as a network interface card), a wireless network interface (such as a wireless network interface card), and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also enable computing system 500 to engage in distributed or remote computing. For example, communication interface 522 may receive instructions from a remote device or send instructions to a remote device for execution.

As illustrated in FIG. 5, exemplary computing system 500 may also include a primary storage device 532 and/or a backup storage device 534 coupled to communication infrastructure 512 via a storage interface 530. Storage devices 532 and 534 generally represent any type or form of storage device or medium capable of storing data and/or other computer-readable instructions. For example, storage devices 532 and 534 may represent a magnetic disk drive (e.g., a so-called hard drive), a solid state drive, a floppy disk drive, a magnetic tape drive, an optical disk drive, a flash drive, or the like. Storage interface 530 generally represents any type or form of interface or device for transferring data between storage devices 532 and 534 and other components of computing system 500.

In certain embodiments, storage devices 532 and 534 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 534 may also include other similar structures or devices for allowing computer software, data, or other computer-readable instructions to be loaded into computing system 500. For example, storage devices 532 and 534 may be configured to read and write software, data, or other computer-readable information. Storage devices 532 and 534 may be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from those shown in FIG. 5. Computing system 500 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of computing device 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules described herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing device comprising:
a packet forwarding device configured to generate, as part of a link diagnostic test, traffic that falls below a certain threshold by a deficit;
a packet replication device configured to:
receive at least a portion of the traffic from the packet forwarding device; and
replicate the portion of traffic to generate supplemental traffic that compensates for the deficit; and
an interface configured to transmit the supplemental traffic to a remote device via a link as part of the link diagnostic test.

2. The computing device of claim 1, wherein the packet forwarding device is further configured to:
calculate the deficit; and
program the packet replication device to be able to generate the supplemental traffic that compensates for the deficit.

3. The computing device of claim 2, wherein the packet forwarding device is further configured to:
determine a replication power of the packet replication device;
determine a number of cycles for the packet replication device to circulate the portion of traffic via a loopback path to generate the supplement traffic based at least in part on the traffic, the certain threshold, and the replication power of the packet replication device; and
program the packet replication device to generate the supplemental traffic by cycling the portion of traffic in accordance with the number of cycles.

4. The computing device of claim 3, wherein the packet forwarding device is further configured to determine the number of cycles by:
dividing the certain threshold by an amount of traffic to produce a quotient; and
dividing the quotient by the replication power of the packet replication device to calculate the number of cycles.

5. The computing device of claim 3, wherein the packet forwarding device is further configured to determine the replication power of the packet replication device by identifying a number of copies that the packet replication device is capable of generating per cycle via the loopback path.

6. The computing device of claim 3, wherein the loopback path comprises:
an ingress processor;
a destination lookup unit;
an ingress results processor; and
a fabric.

7. The computing device of claim 1, wherein the packet replication device is further configured to:
generate a first portion of the supplemental traffic;
forward a majority of the first portion toward the interface for transmission to the remote device; and
cycle the portion of the traffic or a minority of the first portion of the supplemental traffic via a loopback path that leads back to the packet replication device.

8. The computing device of claim 7, wherein the packet replication device is further configured to:
generate a second portion of the supplemental traffic based at least in part on the portion of the traffic or the minority of the first portion;
forward a majority of the second portion toward the interface for transmission to the remote device; and
cycle the portion of the traffic, the minority of the first portion of the supplemental traffic, or a minority portion of the second portion of the supplemental traffic via the loopback path that leads back to the packet replication device.

9. The computing device of claim 7, wherein the minority of the first portion consists of a single copy of the portion of traffic received by the packet replication device from the packet forwarding device.

10. The computing device of claim 1, further comprising:
an additional packet replication device configured to:
receive the portion of the traffic from the packet forwarding device; and
replicate the portion of traffic to generate additional traffic that compensates for the deficit; and
an additional interface configured to transmit the additional traffic to an additional remote device via an additional link as part of the link diagnostic test.

11. A system comprising:
a computing device; and
an additional computing device communicatively coupled to the computing device via a link, the additional computing device comprising:
a packet forwarding device configured to generate, as part of a link diagnostic test, traffic that falls below a certain threshold by a deficit;
a packet replication device configured to:
receive at least a portion of the traffic from the packet forwarding device; and
replicate the portion of traffic to generate supplemental traffic that compensates for the deficit; and
an interface configured to transmit the supplemental traffic to the computing device via the link as part of the link diagnostic test.

12. The system of claim 11, wherein the packet forwarding device is further configured to:
calculate the deficit; and
program the packet replication device to be able to generate the supplemental traffic that compensates for the deficit.

13. The system of claim 12, wherein the packet forwarding device is further configured to:
determine a replication power of the packet replication device;

determine a number of cycles for the packet replication device to circulate the portion of traffic via a loopback path to generate the supplement traffic based at least in part on the traffic, the certain threshold, and the replication power of the packet replication device; and program the packet replication device to generate the supplemental traffic by cycling the portion of traffic in accordance with the number of cycles.

14. The system of claim 13, wherein the packet forwarding device is further configured to determine the number of cycles by:

dividing the certain threshold by an amount of traffic to produce a quotient; and dividing the quotient by the replication power of the packet replication device to calculate the number of cycles.

15. The system of claim 13, wherein the packet forwarding device is further configured to determine the replication power of the packet replication device by identifying a number of copies that the packet replication device is capable of generating per cycle via the loopback path.

16. The system of claim 13, further comprising a controller that directs the additional computing device to perform the link diagnostic test.

17. The system of claim 11, wherein the packet replication device is further configured to:

generate a first portion of the supplemental traffic;

forward a majority of the first portion toward the interface for transmission to the computing device; and cycle the portion of the traffic or a minority of the first portion of the supplemental traffic via a loopback path that leads back to the packet replication device.

18. The system of claim 17, wherein the packet replication device is further configured to:

generate a second portion of the supplemental traffic based at least in part on the traffic or the minority of the first portion;

forward a majority of the second portion toward the interface for transmission to the computing device; and cycle the portion of the traffic, the minority of the first portion of the supplemental traffic, or a minority portion of the second portion of the supplemental traffic via the loopback path that leads back to the packet replication device.

19. The system of claim 17, wherein the minority of the first portion consists of a single copy of the portion of traffic received by the packet replication device from the packet forwarding device.

20. A method comprising:

generating, by a packet forwarding device as part of a link diagnostic test, traffic that falls below a certain threshold by a deficit;

receiving, by a packet replication device, at least a portion of the traffic from the packet forwarding device;

replicating, by the packet replication device, the portion of traffic to generate supplemental traffic that compensates for the deficit; and transmitting, by an interface, the supplemental traffic to a remote device via a link as part of the link diagnostic test.

* * * * *